United States Patent [19]

Petrak

[11] Patent Number: 4,694,943

[45] Date of Patent: Sep. 22, 1987

[54] GROUND CLUTCH ASSEMBLY WITH DYNAMIC ENGAGEMENT AND DISENGAGEMENT

[75] Inventor: Harry A. Petrak, Boulder, Colo.

[73] Assignee: Boulder 12 Investments, Boulder, Colo.

[21] Appl. No.: 820,731

[22] Filed: Jan. 21, 1986

[51] Int. Cl.$^4$ .................. B60B 27/00; B60K 23/08; F16D 1/06; F16D 43/20

[52] U.S. Cl. .................................. 192/35; 192/40; 192/93 A; 403/1

[58] Field of Search .............. 192/35, 40, 54, 92, 192/93 A; 403/1; 180/247

[56] References Cited

U.S. PATENT DOCUMENTS

| | | | |
|---|---|---|---|
| 3,123,169 | 3/1964 | Young et al. | 192/40 X |
| 4,238,014 | 12/1980 | Petrak | 192/93 A X |
| 4,281,749 | 8/1981 | Fogelberg | 192/93 A X |
| 4,287,972 | 9/1981 | Petrak | 192/93 A X |
| 4,534,455 | 8/1985 | Fujikawa | 192/40 |
| 4,557,358 | 12/1985 | Petrak | 192/35 |

FOREIGN PATENT DOCUMENTS 2026108  1/1980  United Kingdom ............... 192/54

Primary Examiner—Rodney H. Bonck
Attorney, Agent, or Firm—John E. Reilly

[57] ABSTRACT

Conversion of a vehicle between two-wheel drive and four-wheel drive is effected by means of a camming assembly and a shift mechanism to temporarily lock the camming assembly against rotation in advancing a drive gear into driving engagement with a receiving gear in converting to four-wheel drive, or to re-engage the camming assembly under the control of the shift mechanism as a preliminary to disengaging the drive gear from the receiving gear in converting to two-wheel drive.

25 Claims, 13 Drawing Figures

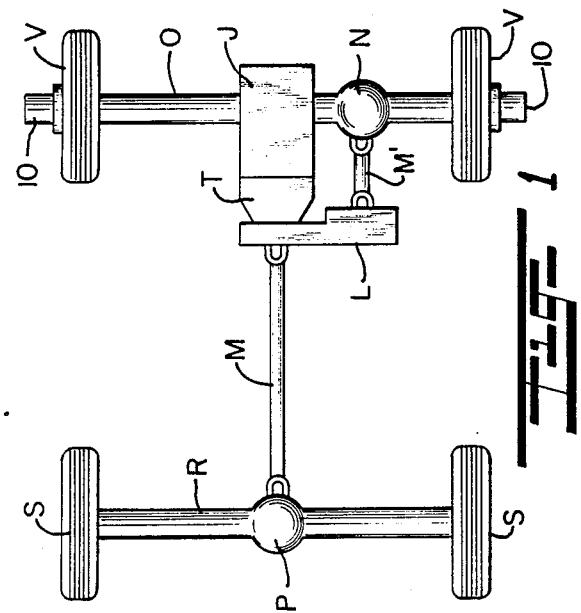
FIG. 1
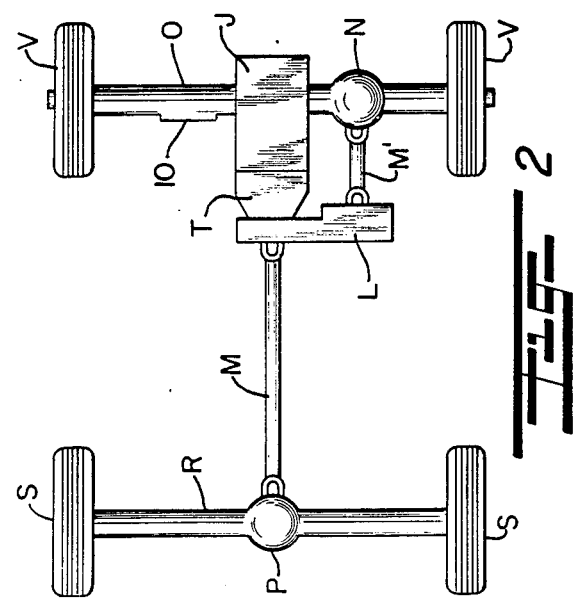
FIG. 2
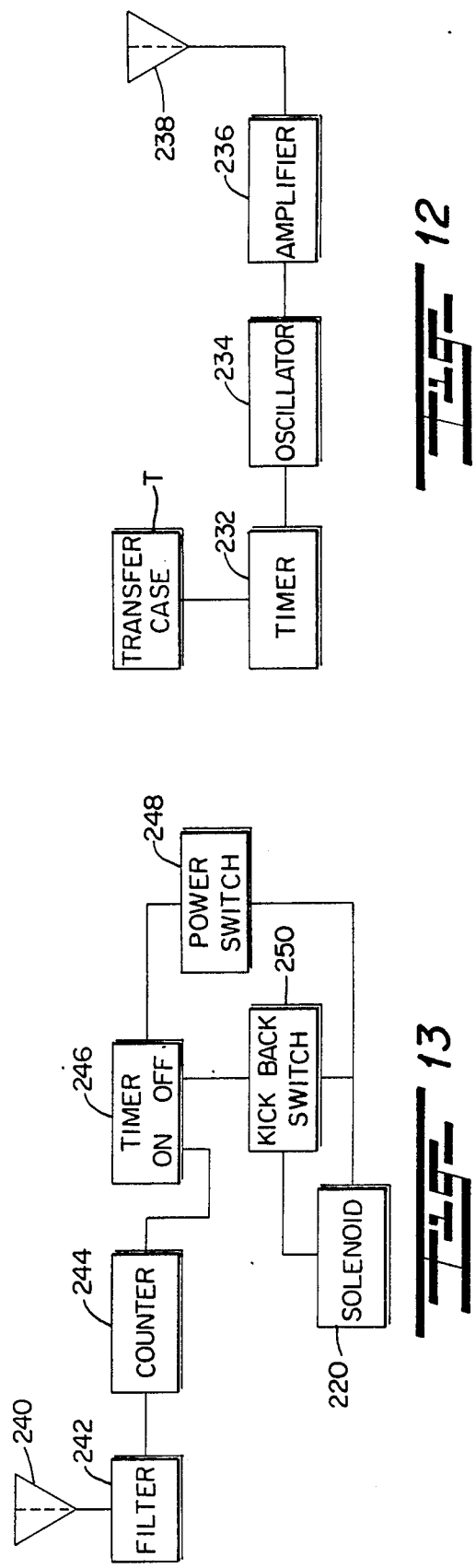
FIG. 12
FIG. 13

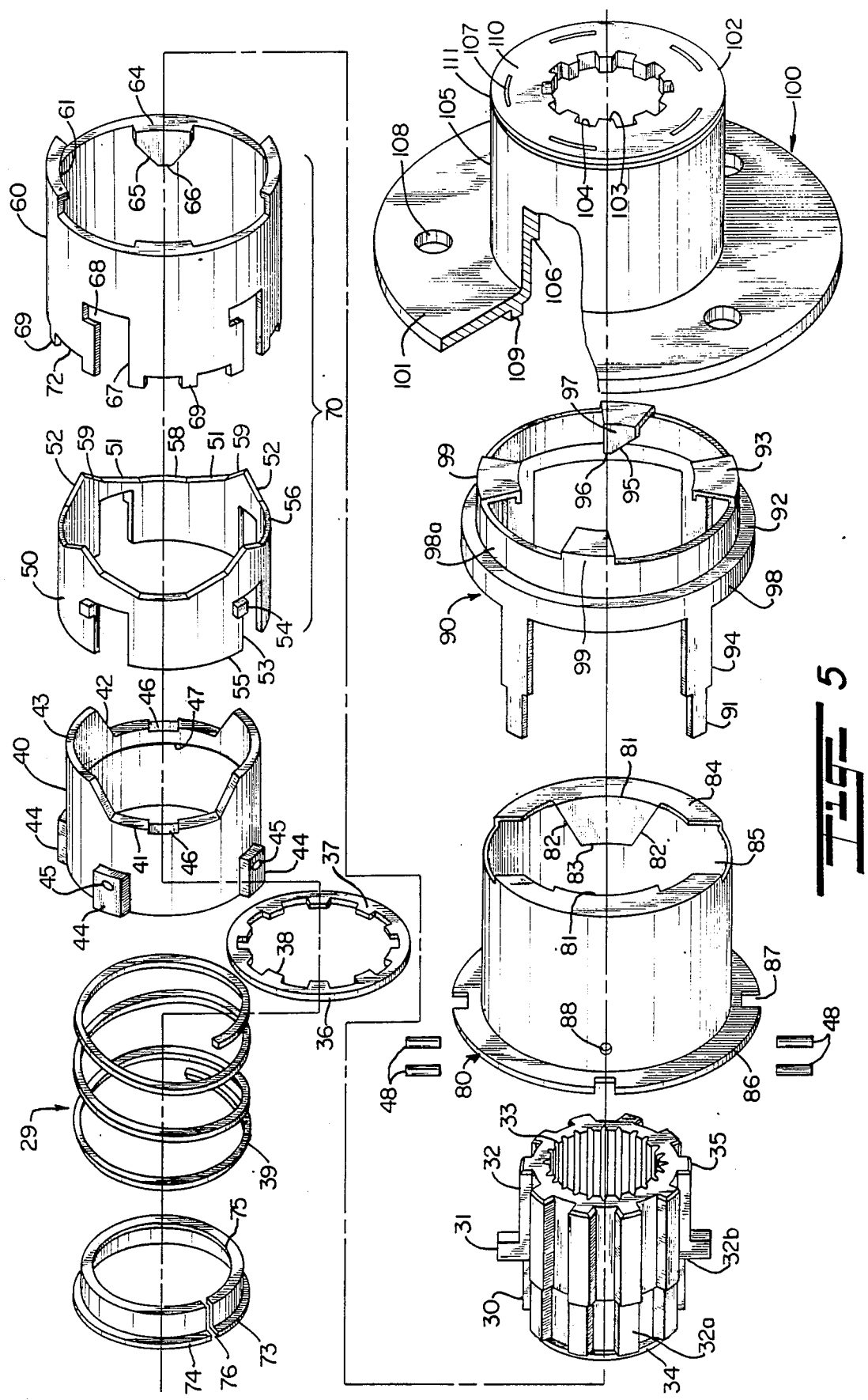
F I G 5

GROUND CLUTCH ASSEMBLY WITH DYNAMIC ENGAGEMENT AND DISENGAGEMENT

This invention relates to clutch assemblies and more particularly relates to novel and improved clutch assemblies for converting a vehicle between two-wheel drive and four-wheel drive either when the vehicle is stopped or in motion.

BACKGROUND AND FIELD OF THE INVENTION

It is desirable to afford increased automation in four-wheel drive vehicles and in particular to permit selective engagement and disengagement of half of the drive train so as to establish four-wheel drive or two-wheel drive under the complete control of the operator. This is especially important if the vehicle is in motion and it is necessary to convert between two-wheel and four-wheel drive while the vehicle is in motion or "on the fly". Typically, in the past, clutch assemblies have required that the vehicle operator stop the vehicle, then reverse it as a preliminary to disengaging or converting from four-wheel drive to two-wheel drive. However, with the increased need for four-wheel drive adhesion on slippery turnpikes or busy highways, the desirability of engaging or disengaging on the fly is apparent.

Numerous approaches have been taken in the past to permit dynamic engagement or disengagement on the fly. One approach has been to employ a supplementary or remote power source to actuate a drive gear, or to employ pneumatic systems whereby vacuum or fluid pressure motors or valves cause the drive gear to engage and subsequently disengage by spring pressure when the vacuum or fluid pressure is removed. The same type of system employing hydraulic pressure and an outside power source similar to the brake system has been employed in an effort to accomplish the same end. However, the approaches taken in the past have for the most part required that the pressure or pressure drop be maintained across the valve or motor actuators throughout the extended time of four-wheel drive mode operation as well as to maintain sufficient pressure to compress the disengaged spring member.

The above and other approaches which employ supplementary or outside power sources have necessitated the use of conduits to transmit power along the underside of the vehicle to or near the axles and wheels at locations normally subjected to abuse, striking surface obstructions as well as being subject to flying debris, mud or water and it is extremely difficult to effectively armor or protect the conduits along the axle or suspension area. Furthermore, in using supplementary power sources, it is extremely important to provide a system which will "fail-safe" into the four-wheel drive mode as opposed to fail-safing into the two-wheel drive mode.

Another important consideration is that the supplementary power source adds considerably to the original cost and maintenance of the vehicle but seldom can be retrofit to existing vehicles and generally requires considerable design changes to the wheel and drive train components.

Still further, units which rely upon cam members to effect engagement to ground or a fixed locking member in the course of converting to four-wheel drive must rely upon some form of a drive spring which remains engaged with the locating cams at the conversion into four-wheel drive. Specifically, the approaches taken had been to employ either a wrap spring engagement to ground and which spring is released after camming but is continuously driven in the four-wheel drive mode, or a high friction cone-shaped clutch which is also continuously driven and remains engaged during four-wheel drive mode. Still further, a common practice has been to rely upon a large spring to effect disengagement between the driver and receiving gears in converting from four-wheel drive mode back into two-wheel drive mode. It is highly desirable to avoid reliance upon a spring member either to effect engagement to ground or to disengage the drive and receiver gears and in such a way as to effect complete disengagement from ground both during four-wheel drive and two-wheel drive mode so that when the mechanism is shifted to two-wheel drive mode, spin-down of the rotating components can be achieved.

SUMMARY OF THE INVENTION

It is therefore an object of the present invention to establish automatic engagement and disengagement of a vehicle while in motion in response to remote operator control and without the need to stop the vehicle, back up or change vehicle direction.

It is another object of the present invention to maintain four-wheel drive gear engagement throughout all four-wheel drive operations including directional changes irrespective of available torque, torque drop-off, surface adhesion, wheel speed versus shaft speed, component condition, extreme temperature, vibrations, coasting, braking and the like.

A further object of the present invention is to employ readily available drive shaft power sources of the vehicle to engage and disengage the clutch assembly without employing an outside power source and obviate the need for lines, conduits, cables and other linkage to the assembly.

An additional object of the present invention is to provide a novel and improved clutch assembly which is inexpensive, easy to install, maintain and retrofit to existing vehicles; and further wherein the assembly offers reliable conversion into the four-wheel drive mode.

A still further objective and purpose of the present invention is to provide in an automatic clutch assembly for simultaneous actuation of the two driving shafts or wheels by synchronizing engagement and disengagement; and further coupled with a fail-safe override to prevent damage to the drive train or device during abnormal or normal use or actuation of the system.

Yet a further object of the present invention is to provide a novel and improved automatic clutch assembly which eliminates the need for separate or additional power sources, special lubricants and seals and which is compatible with the lubricants and environment within the drive train system and envelope while eliminating the need for any special driver functions or procedures.

Another object of the invention is to provide an automatic clutch assembly which maintains that mode of operation to which it was last shifted and in particular four-wheel drive mode gear engagement, even though the vehicle engine may be shut off and the vehicle parked. And further wherein in positive engagement and disengagement of camming members is effected in converting between two-wheel drive and four-wheel drive modes so as to avoid reliance upon spring force to achieve said and to permit disengagement from ground in both modes of operation.

In accordance with the present invention, a clutch assembly has been devised for converting a vehicle between two-wheel drive and four-wheel drive by effecting dynamic engagement and disengagement between a drive shaft and a ground engaging wheel to be driven and wherein torque applying means are provided for selectively and positively rotating the drive shaft, the clutch assembly comprising a fixed locking member, a receiver gear drivingly connected to the wheel to be driven, a drive gear keyed for rotation with the drive shaft and being axially movable with respect to said drive shaft, the drive gear provided with at least one cam follower; and an axially movable camming assembly is disposed in outer concentric relation to the drive gear and provided with camming surface means engagable with the cam follower to impart axial movement to the drive gear when the camming assembly is fixed against rotation and the drive gear is being rotated by the drive shaft. Shift means is operative to advance the camming assembly into engagement with the fixed locking member whereby to temporarily lock the camming assembly against rotation, the drive gear being responsive to positive rotation of the shaft to advance the camming assembly into direct engagement with the fixed locking member in traversing a first portion of the cam surface whereupon the drive gear is successively advanced in an axial direction into engagement with the receiving gear in traversing a second portion of the cam surface followed by advancing the camming assembly away from the locking member so that the shift means and camming assembly are free to follow rotation of the drive gear.

Other objects, advantages and features of the present invention will become more readily appreciated and understood when taken together with the following detailed description in conjunction with the accompanying drawings, in which:

BRIEF DESCRIPTION OF THE DRAWINGS

FIG. 1 is a schematic plan view of the power train of a four-wheel drive vehicle which employs two hublocks, one at each front wheel, for the purpose of engaging and disengaging the power train into the front axle.

FIG. 2 is another schematic view of the power train of a four-wheel drive vehicle which employs a single axle disconnect for the purpose of engaging and disengaging the power train at the disconnect location of a front axle.

FIG. 5 is an exploded view of the cams, interrupter, drive and receiving gear which serve as the mechanical power train of the assembly.

FIG. 11 is an exploded view of the retainer and encapsulating cap for the electrical and electronic components and their locational relationship.

FIG. 12 is a flow diagram of a signal transmitting system for remote activation of the preferred form of clutch assembly for shifting into and out of four-wheel drive; and FIG. 13 is a flow diagram of the activating means including a signal receiving circuit in accordance with the present invention.

DETAILED DESCRIPTION OF THE INVENTION

As a setting for the present invention, there is shown by way of illustrative example in FIG. 1 the power train of a conventional four-wheel drive vehicle in which an engine J is provided with a transmission T into a rear propeller shaft M and a transfer case L, the latter directed into a front propeller shaft M' into front differential N and front axle O. The rear propeller shaft M in turn is coupled to rear differential P into the rear axle R for rear wheel S. The front axle O into front wheels V is equipped with left and right clutch assemblies in the form of automatic hub locks 10 in accordance with the present invention so that engine power is transmitted through the transmission T via the transfer case L and front propeller shaft M' to the front differential N and axle O. FIG. 2 illustrates application of the automatic hub lock 10 of the present invention as an automatic disconnect at the front axle shaft in which the automatic axle disconnect or hub lock 10 is housed within the front axle O in the manner illustrated in FIG. 2. In FIG. 2, like parts to those of FIG. 1 are correspondingly designated. Generally, when the operator desires four-wheel drive, the transfer case L is shifted to engage the front drive system thereby supplying power to the front propeller shaft and via the differential N to the front axle O which powers or torques the front drive shafts in a manner which will become more apparent in relation to FIG. 3.

Although the invention has a number of useful applications, for the purpose of illustration, it is shown in FIGS. 1 and 2 respectively applied to the wheels of a four-wheel drive vehicle as well as at an axle disconnect position of a vehicle. Thus, in FIG. 1, the invention as illustrated is applied to the two front wheels of a vehicle and in FIG. 2 as an automatic axle disconnect at a front drive shaft A and housed within the front axle O as shown.

As shown in FIGS. 1 and 2, during normal two-wheel drive mode operation, the engine power is transmitted through the transmission T in direct line through the transfer case L and rear propeller shaft M to the rear differential P and axle R. When four-wheel drive mode is required, the transfer case L is shifted to engage the front drive system to supply power to the front propeller shaft M' through the differential N via the front drive shaft A to the hub locks 10.

Figure 3:
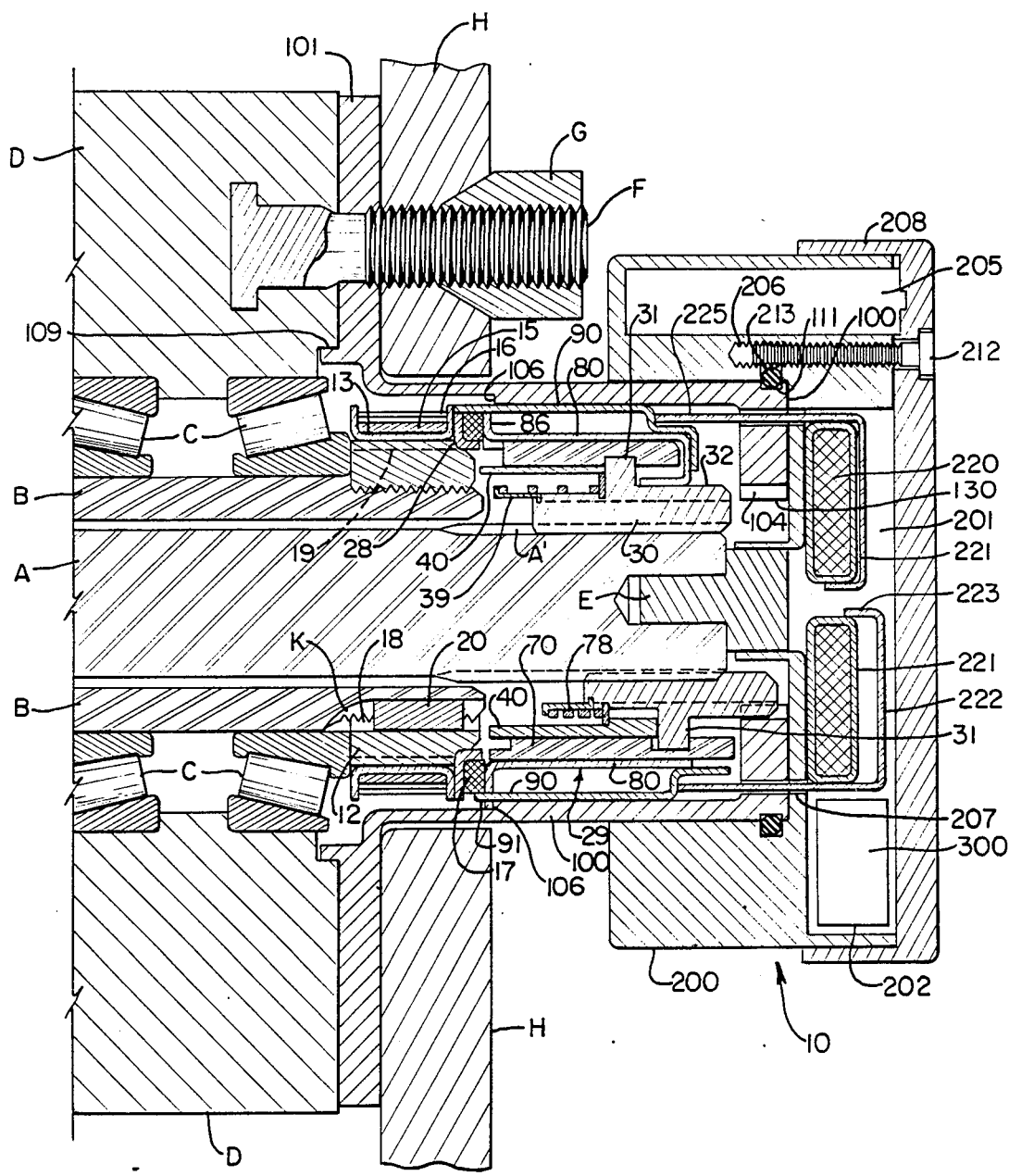
FIG. 3 is a cross sectional view of the clutch assembly wherein the upper half shows the assembly in two-wheel drive mode just as it is triggered to change to four-wheel drive mode, and the lower section shows the assembly in the engaged four-wheel drive mode.

Referring to FIG. 3, drive shaft A, which receives torque or power when the four-wheel drive is engaged by the operator, is housed within a non-rotating spindle B. The drive shaft A extends outwardly beyond the spindle B and is provided with circumferentially spaced, axially extending splines A' along its external surface adjacent to the outboard ends thereof. The outboard end of drive shaft A is fitted with a round T-shaped, enlarged circular end shaft extension E inserted in a counterbore at the outboard end of shaft A; or shaft A could be extended to form the part as a unitary extension.

The spindle B is a non-rotating tubular shaped member which in accordance with conventional practice is externally threaded for a limited distance along its outboard external surface, the threaded length being interrupted by a keyway K which runs on center to and parallel with the axis of the spindle B. Radial bearings C are supported at a circumferential interface with spindle B to radially support and locate a wheel hub D thereby allowing the wheel hub D either to rotate independently or in response to rotation of the shaft A.

Figure 4:
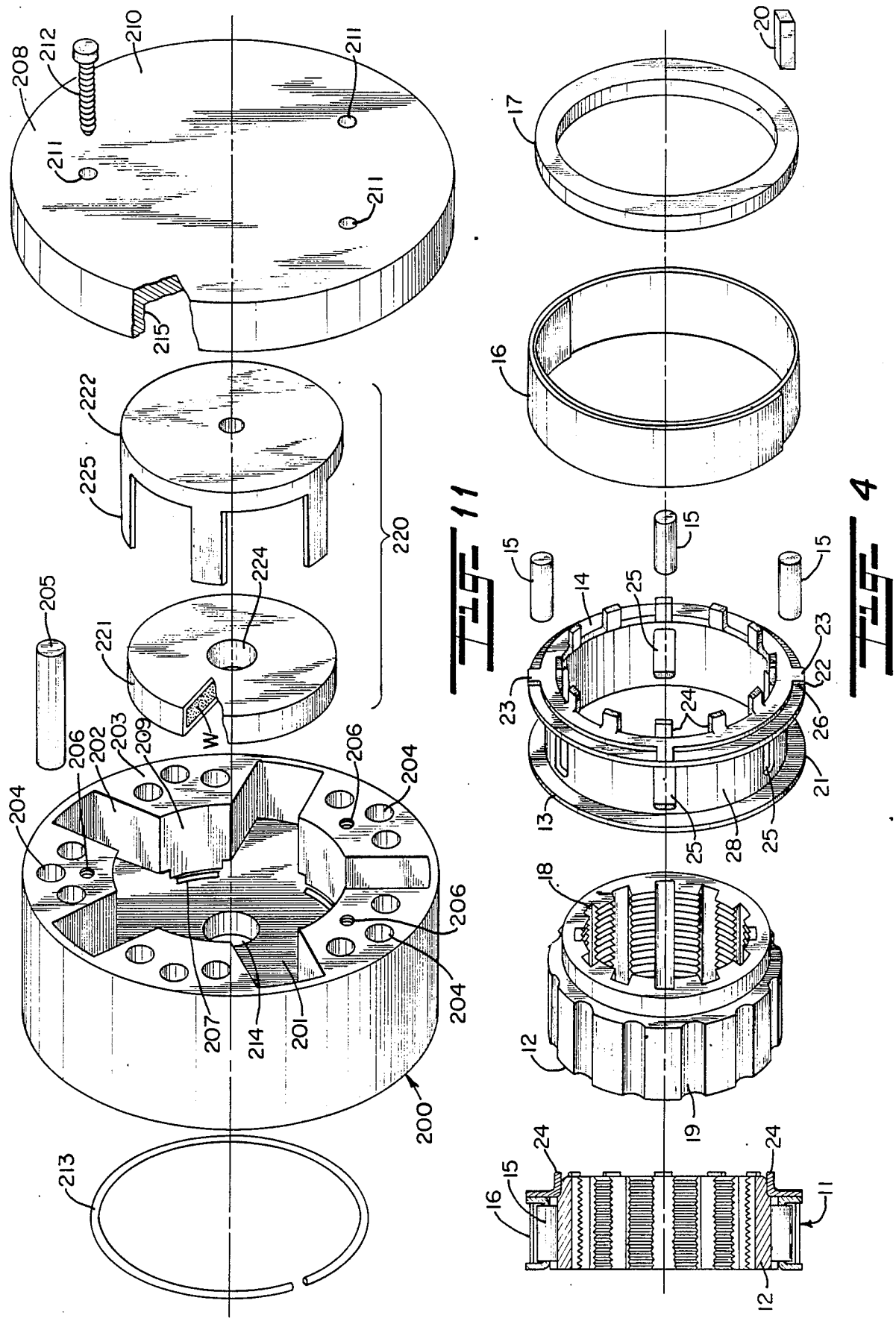
FIG. 4 is an exploded view of the ground clutch of the preferred form of invention.

In accordance with the present invention and by reference to FIGS. 3 and 4, the preferred form of hub lock 10 is in the form of a ground clutch assembly 11, comprised of nut 12, ground driver 28, spacer 17, rollers 15 and wrap spring 16. The nut 12 is internally threaded to screw onto spindle B. Keyways 18 run the linear length of the nut inside diameter at spaced circumferential intervals so that when the nut 12 is screwed onto the non-rotating spindle B, one keyway 18 can be aligned with the spindle keyway K, locking the nut 12 to the spindle B by the insertion of key 20 into the aligned keyways 18 and K in order to fix the nut against rotation. The outer periphery of nut 12 has a series of spaced grooves 19 extending parallel to the nut axis. The ground driver 28 consists of cage 13 permanently affixed to ground flange 14. The cage 13 is of tubular shape with radial flanges 21 and 22 at the inboard and outoard ends of the tube, respectively. Cage 13 has a series of rectangular slots 25 which are equally spaced at the tube circumference and punched through the tubular wall with the slots 25 extending parallel to the axis of the tube. The ground flange 14 is shaped like a washer with tabs 23 equally spaced and extending radially from the outer edge of the washer directly in front of the flange 22. Teeth 24 of the ground flange 14 are circumferentially spaced around the inside diameter of the flange, beyond the flange face 22 in an outboard direction parallel to the axis of the flange 14. Ground flange 14 and roller cage 13 are permanently affixed to each other by welds 26 at the interfacing between the outboard flange 22 of cage 13 and the inboard face 27 of the ground flange 14 forming one integral part of the ground driver 28.

Figure 6:
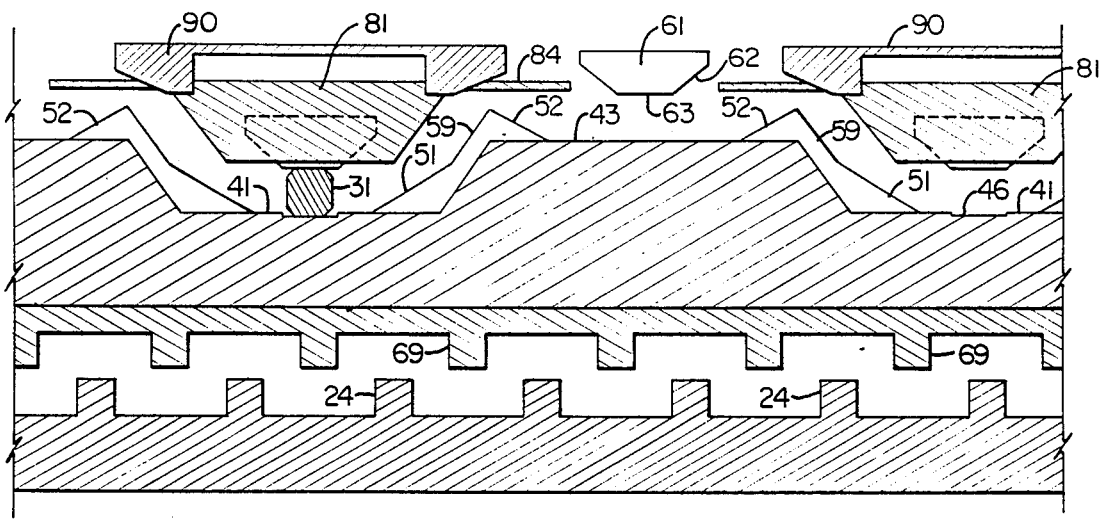
FIGS. 6 through 10 are development views wherein the cylindrical cams are in a single plane, showing the various stages of mechanical functions and engagement between the cams.

Rollers 15 fit within and through slots 25 of the cage 13 enabling the rollers 15 to drop into the grooves 19 of nut 12. The wrap spring 16 is a radial force spring and formed by spirally wrapping a thin strip of spring steel over the prior wrap. In the ground clutch assembly 11, the spring 16 bears against rollers 15 exerting an inward radial force against rollers 15 to retain the rollers 15 within the cage slots 25 as well as to maintain a biased urging of rollers 15 against the nut 12. As shown in FIG. 4, spacer 17 is a thick washer with an inside diameter to tightly fit over teeth 24 of the ground flange 14 and an outside diameter slightly less than the roots of the tabs 23 of ground flange 14. Referring to FIG. 3, spacer 17 maintains a specific interfacing and location of flange 86 of discam 80 and related cams of the gear assembly 29 to be described. Referring to FIGS. 3, 5 and 6, the gear assembly 29 consists of drive gear 30, plateau cam 40, a ground lock cam 70 defined by inner cam 50 and outer cam 60, discam 80, interrupter 90, spiral spring fasteners 48, spring seat 36, spring 39 and spring seat 73.

The drive gear 30 is tubular in shape with equally spaced external splines 32 radiating outwardly to a specific diameter. External splines 32a are a continuation of external splines 32, but radiate outwardly to a smaller diameter forming a step 32b at the intersection of the two diameters. Internal splines 33 are equally spaced on the inside diameter and radiate inwardly. Diametrically opposed cam followers 31 extend radially and outwardly from the outside diameter and beyond the diameter of the splines 32. The outboard edges of the splines 32 are chamfered as at 35 for the purpose of eliminating sharp 90° corners and easing penetration of the drive gear splines into notches 104 of receiving gear 100. An annular circumferential groove 34 is located near the inboard face of the drive gear 30 to provide an attaching recess for flange 75.

The plateau cam 40 is of generally tubular configuration with spaced rectangular lugs 44 disposed on the external surface adjacent to the inboard edge of the cam 40. Holes 45 are formed in the lugs 44 and each has an axis which intersects the longitudinal axis of plateau cam 40 and are located on each lug centerline. The holes 45 are for the purpose of press fit insertion of fastener pins 48 during assembly. The outboard end face of the cam 40 is notched out to form inboard or lower plateaus 41 parallel to the outboard and inboard faces of the tube and which plateaus are connected by faces 42 which rise in an outboard direction, at pre-determined angles, to join with the outboard flat plateau end faces 43. The tubular plateau cam 40 has stepped inner surfaces with the larger diameter opening to the inboard edge and the combination of which, where the two different diameters meet, form an annular ledge 47.

Ledge 47 forms an abutment for spring seat 36 and is slightly closer to the inboard face of plateau cam 40 than is plateau 41. Very shallow notches 46 are formed in the center of inner plateaus 41 and are slightly wider than cam followers 31 of drive gear 30 to provide an "at rest" location for the cam followers 31 on the inner plateaus 41.

Again referring to FIG. 5, inner cam 50 is combined and mechanically interlocked with outer cam 60 to form a unitary ground lock cam 70. Thus, inner cam 50 fits closely into the inside diameter of outer cam 60, the reference terminology of inner and outer referring to the radial location of cam 50 to cam 60 and not their axial locations. The inner cam 50 is tubular and has a series of open, generally rectangular slots 53 at circumferential intervals with entrances on face 55. The slots 53 are of a width and length to fit in close sliding relationship to the lugs 44 of plateau cam 40. Square lugs 54 project radially outward from the cam 50 each adjacent to one axial side of a slot 53, with the outboard face of each lug 54 aligned with the closed end of each slot 53. The outboard end of the tubular inner cam 50 is configured in a series of flats and slopes: Flat faces 56 and 58 extend circumferentially around the axis of the cam 50 and are located at different axial lengths from the inboard end of the cam 50. The lower or inner flat face 58 merges into a gradual outwardly directed slope 51 which in turn merges into a steeper rising slope 59. The slope 59 rises to intersect another gradual slope 52 which slopes back inwardly into the flat face 56. The outer tubular cam 60 is sized to accept the inner cam 50 in close fitting relationship. Circumferentially spaced, open slots 67 at the inboard face of cam 60 have the same rectangular configuration, size and spacing as slots 53 of the cam 50. The slots 67 of cam 60 in addition to aligning with the slots 53 of cam 50 have an additional L-shaped or circumferential leg 68. When the inner cam 50 is inserted into outer cam 60, the lugs 54 of inner cam 50 must pass into slots 67 of cam 60 and, when cam 50 is rotated, lugs 54 rotate and advance into the slot leg 68 of cam 60 to lock the cams 50 and 60 against axial release and at the same time aligning the slots 53 of cam 50 with slots 67 of cam 60.

A pair of diametrically opposed cam lobes 61 project radially inwardly from axially extending tabs at the outboard end of the cam 60. The cam lobes 61 have a trapezoidal shape with a shorter parallel trapezoidal face 63 joined to the outboard face by sloped sides 62, as shown in FIGS. 6 to 10. A matching set of diametrically opposed, trapezoidal shaped cam lobes 64 are circumferentially spaced between the cam lobes 61 and are axially located adjacent to the outboard face of the tubular portion of cam 60 but spaced axially inwardly with respect to the cam lobes 61. A shorter face 66 of the trapezoidal shaped cam lobe 64 is spaced inwardly of the longer parallel face of the trapezoid and is joined to the longer parallel face by slopes 65. At the inboard edge of the tubular shaped cam 60, teeth 69 project axially inwardly from the tubular section and are circumferentially spaced between the slots 67. The interspacing between the teeth 69 being the same as the width of the slots 67.

The ground lock cam 70 is defined by the interlocking of inner cam 50 to outer cam 60 when the lugs 54 are rotationally inserted into the slot leg 68 of slot 67. Additionally, the cams 50 and 60 are locked from independent rotation by slidably assembling the aligned slots 53 and 67 onto the projecting lugs 44 of the plateau cam 40. After the assembly of ground lock cam 70 to the plateau cam 40 the drive gear 30 is inserted until the cam followers 31 abut the lower, inner plateaus 41 of plateau cam 40 in preparation for the acceptance of spring seats 36 and 73 and spring 39.

The spring seat 36 is shaped as a thin washer with a smooth external surface 37 and spline-like teeth 38 projecting radially inwardly therefrom. Teeth 38 intercept the external splined teeth 32a of the drive gear 30 during assembly and operation. Noting the foregoing assembly of drive gear 30 into the outboard end and inside diameter of plateau cam 40, the spring seat 36 is inserted into the inboard end of plateau cam 40 to a position abutting ledge 47 of plateau cam 40. Compression coil spring 39 is next inserted into plateau cam 40 from the inboard end.

As shown in FIGS. 3 and 5, the split spring seat 73 is tubular in shape with a outward radial flange 74 at the inboard end of the tube and inward radial flange 75 at the outboard end of the tube and with an axial slot 76 extending totally through the tube wall and flanges to enable the spring seat diameter and flanges to be expanded during assembly. The flange 74 extends outwardly from the inboard face of the tube to provide an inboard facial abutment and spring seat for compression spring 39. During assembly and in reference to the insertion of spring 39 into plateau cam 40, spring seat flange 74 bears against and compresses spring 39 at the same time that spring seat 73 and flange 75 are expanded to ride over the inboard edge of drive gear 30, after which flange 75 snaps into groove 34 of drive gear 30 and the spring seat 73 is allowed to snap back to its original diameter. The cam follower 31 of drive gear 30 is biased against the lower plateau 41 of plateau cam 40 during this part of the assembly process.

The discam sleeve 80 includes a flange 86 extending outwardly at the inboard end and open notches 87 are equally spaced along the peripheral edge. Holes 88 are punched through the tubular wall in spaced relationship to match the holes 45 in plateau cam 40. A flange 84 extends radially inwardly at the outboard end of the tubular cam 80 with open notches 85 at equally spaced circumferential intervals along the flange 84. Discam lobes 81 are tab-like continuations of flange 84 which have been bent inwardly toward the inboard end of discam 80 so as to form annular inner concentric sections with sloped surfaces 82 which terminate in end faces 83 in a plane parallel to flanges 84 and 86. The discam 80 slides over and encapsulates ground lock cam 70 and lugs 44 of plateau cam 40 and is rigidly affixed to the plateau cam 40 by the insertion of the fasteners 48 through the holes 88 into the holes 45 of the plateau cam 40. Though the ground lock cam 70 is interspaced between the outside diameter of plateau cam 40 and the inside diameter of discam 80 the ground lock cam 70 is able to slide axially in response to the rotation of cam follower 31. The extended cam lobes 61 of ground lock cam 70 project into and are slideable through notched openings 85 of discam 80 during axial movement of ground lock cam 70.

An interrupter 90 has an annular wall section 98 with axially extending legs 94 terminating at their inboard edges in narrow tips 91 having squared end faces. An annular ledge 92 extends radially and inwardly from the wall 98 into the base of annular wall 98a. Wall 98a extends axially outward to terminate in hook-like tabs 99. Tabs 99 extend axially in an outboard direction then bend to form flat faces 93 which are in a plane normal to the axis of the interrupter then are reversed to extend in an inboard direction to form lobes 97 in inner concentric relations to wall 98a. The lobes 97 have sloped faces 95 which merge into flat faces 96, the latter in a plane normal to the axis. The interrupter 90 is sized and configured to enable its sliding fit over the outside diameter of discam 80, allowing the inboard tips 91 of legs 94 to slide into notches 87 of discam 80 and the lobes 97 to slide into the inside diameter of flanges 84 of discam 80 at locations adjacent to lobes 81 of discam 80.

The receiving gear 100 which surrounds the assembly 29, takes the form of a cylindrical cup with a broad flange 101 extending radially and outwardly at the inboard end of the cup. The outboard end of the cup has an end wall 102 with a central opening surrounded by teeth 103 and notches 104 between the teeth, the teeth 103 and resulting spline openings 104 running parallel to the axis of the cup. Arcuate slots 107 are equally spaced circumferentially and extend through the end wall 102. The cylindrical wall 105 extends in an inboard direction from end wall 102 and changes inside diameter and wall thickness to a larger inside diameter and thinner wall as it approaches flange 101, forming an inside annular ledge 106 whose face is in a plane normal to the axis of the gear 100. An annular groove 111 is formed in the external surface of the wall 105 adjacent to the end wall 102. Round holes 108 penetrate through flange 101 and are equally spaced and radially located to accept the wheel hub studs F. The flange 101 abuts the wheel hub D during installation and has an annular boss 109 that is inserted into a counterbore in the outer face of wheel hub D to concentrically locate the receiving gear 100 with respect to wheel hub D and shaft A.

As illustrated in FIGS. 3 and 11, a cup-shaped housing 200 has an internal cavity 201 communicating with equally spaced recesses 202 at the outboard end of the housing 200 between circumferentially spaced bosses 203 at the outboard end of the housing. Each boss 203 is provided with counterbores 204 through the outboard surface parallel to the centerline of the housing 200 and terminate near the inboard face to serve the purpose of retaining dry cell batteries 205. Threaded bores 206 on three of the bosses 203 are on axes parallel with the axes of pockets 204. Slots 207 are generally crescent-shaped and are formed adjacent to the inside walls 209 of bosses 203 to provide axial openings through the inboard wall of cavity 201. Slots 207 align with slots 107 of receiving gear 100 when housing 200 is attached to gear 100 providing open arcuate passage-ways from the internal cavity 201 to the inside chamber of gear 100. A center hole 214 located concentrically on center within the recess 201 forms a radial bearing surface to support extension E of shaft A.

An outboard end cap 208 is shown as a shallow cylindrical cup with an inside diameter 215 to fit closely over the outside diameter of housing 200. The outboard closed end 210 of end cap 208 has three bores 211 in alignment with threaded bores 206 for the fastening of end cap 208 to the housing 200 using the screw fasteners 212. Referring to FIG. 3, during final assembly and affixing housing 200 to receiving gear 100, the screw fasteners 212 contract the diameter of a split spring ring 213 thereby driving it into locking engagement with annular groove 111 of the receiving gear 100.

Referring again to FIGS. 3 and 11, solenoid assembly 220 is of a generally annular shape consisting of a disk 221 with an inner surface and outside surface and two parallel flat walls integral with the inner and outer surfaces forming an interior compartment and encapsulating interior windings of insulated wire W. A solenoid thruster 222 is generally cup-shaped with a central tubular boss 223 projecting inboard into the inner open core 224 of solenoid casing 221, as shown in FIG. 3. The thruster 222 has a thin cylindrical body in concentric relation to the outside of casing 221 and axial legs 225 extend inboard to slide through the arcuate slots 107 of receiving gear 100 and arcuate slots 207 of housing 200. Thus the inboard ends of legs 225 interface with ledge 92 of interrupter 90. Referring to FIG. 3, a signal receiving circuit generally designated at 300 is housed within the recesses 202 and interconnect the solenoid assembly 220 with the batteries 205. The circuit 300 being hereinafter described with reference to FIG. 13.

As shown in FIG. 3, the upper half of the sectioned assembly drawing shows the unit in two-wheel drive mode with the drive gear 30 spaced from the teeth 103 of the receiving gear 100. This upper half section also shows the product at the instant the leg tips 91 of interrupter 90 have mechanically interconnected discam 80 to the ground driver 28 of ground clutch 11 as a result of the solenoid 220 having forced the solenoid legs 225 against ledge 92 of interrupter 90 thereby causing the leg tips 91 of interrupter 90 to intercept and strike against the sides of tabs 23 of ground clutch 11. The lower half section of the FIG. 3 shows the unit in four-wheel drive mode with the driving connection of drive gear 30 to the receiving gear 100 and the legs 225 and tips 91 retracted.

The functional relationship of components in working combination becomes readily apparent with reference to the above and FIGS. 6 through 10 which depict the function of the assembly. For clarity of presentation the tubular shaped cams are developed in a single plane when viewed from the axis of the tubes when viewed radially outward. Additionally, the bottom of each view in FIGS. 6 through 10 is the inboard end of FIG. 3 and correspondingly the top of each view in FIGS. 6 through 10 is the outboard end.

Referring to FIG. 6, the cam follower 31 of drive gear 30 abuts the shallow detent 46 of the lower plateau 41 of plateau cam 40 and, since the cam follower 31 is at its farthest inboard location, the drive gear 30 does not engage receiving gear 100 and the assembly remains in its two-wheel drive mode. Additionally, the teeth 69 of ground lock cam 70 are axially separated from the teeth 24 of ground clutch 11 and thus the cams of the gear assembly 29 remain dormant in two-wheel drive mode, or can rotate from a jounce, false torque or applied torque to drive gear 30 and the assembly would still remain in two-wheel drive and the cams and gear will rotate in unison as an assembly. As noted in FIG. 3, the cam follower 31 is biased against and into detent 46 by spring 39.

In order to actuate toward four-wheel drive, as best seen from FIGS. 3 and 6, a force or torque must be applied to rotate the drive shaft A and in turn rotate drive gear 30 and cam follower 31 which also causes the plateau cam 40, ground lock cam 70, discam 80 and interrupter 90 to rotate in unison with the drive gear 30.

Figure 7:
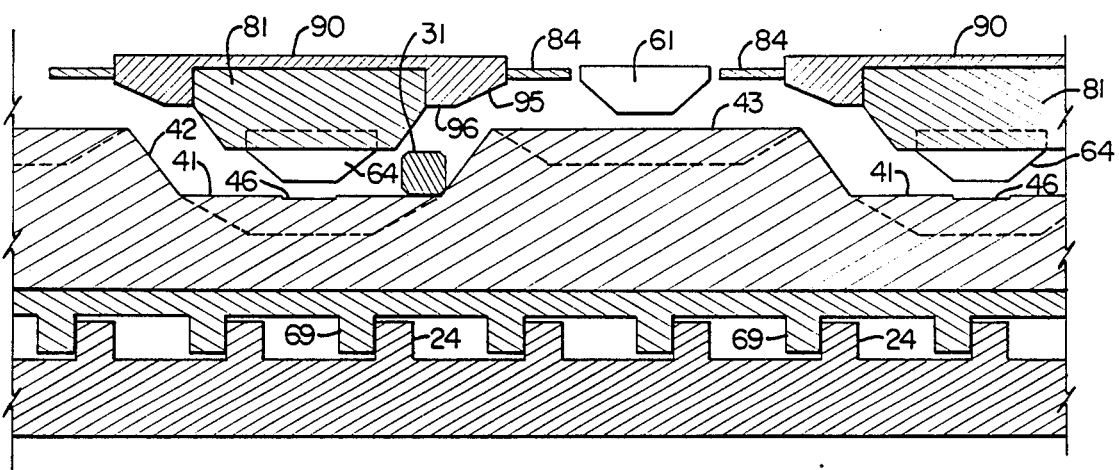

Referring to FIGS. 3 and 7, in order to advance the assembly to four-wheel drive mode, a command signal is transmitted to the electronic circuitry 300, which in turn closes the circuit from the batteries 205 to solenoid 220, energizing the solenoid 220 and thrusting solenoid legs 225 against the ledge 92 of interrupter 90 to drive the interrupter 90 inboard. The interrupter leg tips 91, thrusting through the flange 86 of discam 80, intercept the tabs 23 of the non-rotating ground clutch 11, causing a sudden interruption of the rotating cams 80, 40 and 70. Referring specifically to FIGS. 6 and 7, the interrupter 90 has been driven inboard to abruptly stop cam rotation. The plateau cam 40 is locked to the ground lock cam 70 and, though the ground lock cam 70 can slide axially in relation to the plateau cam 40, they remain rotationally locked with the drive gear 30 and cam follower 31 continuing to rotate under torque. As the cam follower 31 drives from left to right, the cam follower strikes sloped surface 51 of ground lock cam 70 to drive it inboard and cause the teeth 69 of ground lock cam 70 to intercept and engage teeth 24 of ground clutch 11; and the plateau cam 40 is also engaged to ground and locked against rotation by the resistance of the ground clutch 11 to rotation. Referring to FIG. 7, cam lobes 64 and 61, which are part of the ground lock cam 70, are driven inboard into the path of the cam follower 31.

Figure 8:
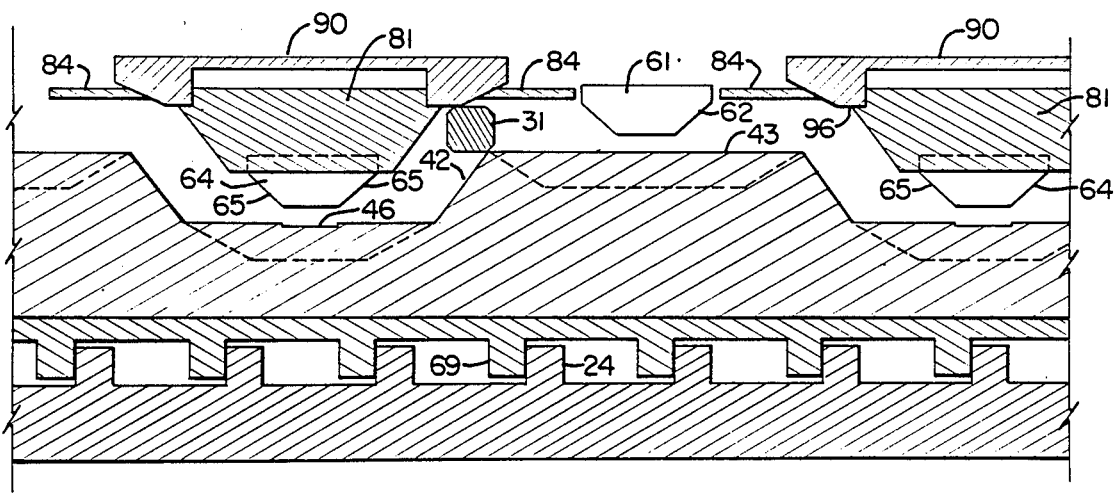

As shown in FIGS. 3 and 8, as the cam follower 31 continues driving to the right it climbs the slope 42 of plateau cam 40 causing the splines 32 of the drive gear 30 to intercept and engage splines 103 of receiving gear 100. Again referring to FIG. 8, as the cam follower 31 drives to the top of the slope 42 it drives against the face 96 of interrupter 90 driving interrupter 90 outboard and correspondingly driving solenoid legs 225 outboard and de-energizing the solenoid 220, and as the cam follower 31 is driving interrupter 90 outboard, the interrupter leg tips 91 are driven out of interception with ground clutch 11. When the cam follower 31 reaches the top of the sloped surface 42, as noted in FIG. 8, it is in a position to advance across plateau 43 of the plateau cam 40. It will be observed that teeth 69 of lock cam 70 remain engaged with teeth 24 of the ground cluth 11. If desired, the slope 42 can be increased to cause cam follower 31 to climb slope 59 of groundlock cam 70; and upon the cam follower reaching the matching junction of slopes 59 and 43, cam follower 31 then would traverse plateau 43.

Figure 9:
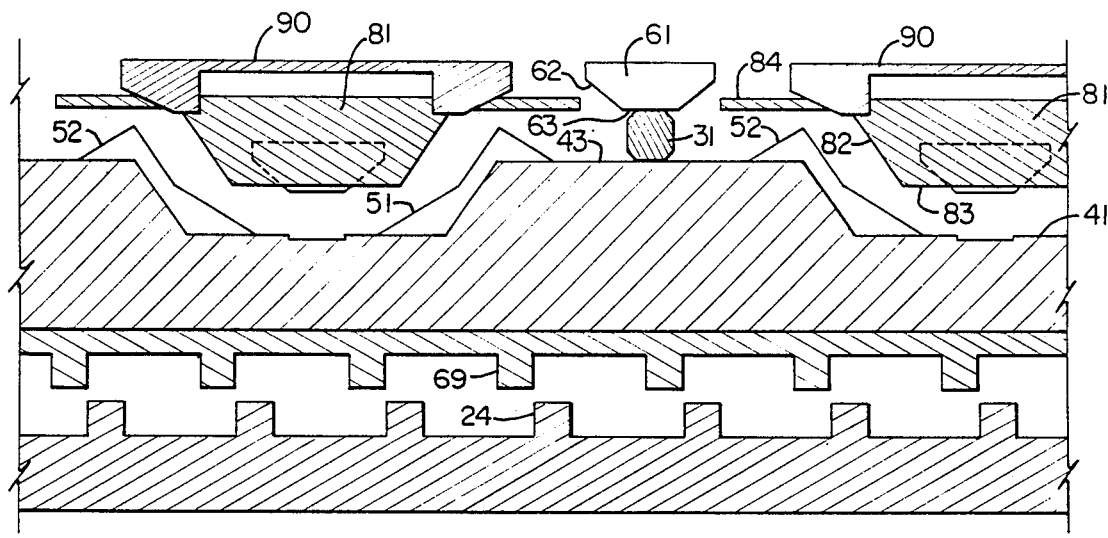

Referring to FIG. 9, the cam follower 31 in traversing the outboard plateau 43 is driven against face 62 of lobe 61 which is integral to ground lock cam 70 thereby driving ground lock cam 70 out of engagement with ground clutch 11 by separating the teeth 69 from engagement with teeth 24. Referring to FIGS. 9 and the lower quarter section of FIG. 3, the drive gear 30 is in full engagement with receiving gear 100 so as to impart torque to the receiving gear 100 in four-wheel drive mode. The cam follower 31 is biased against the outboard plateau 43 of plateau cam 40 and, with the separation of the ground lock cam 70 from the ground clutch 11 the cams 40, 70, 80 and interrupter 90 are free to rotate in unison with the drive gear 30 in the four-wheel drive mode.

Figure 10:
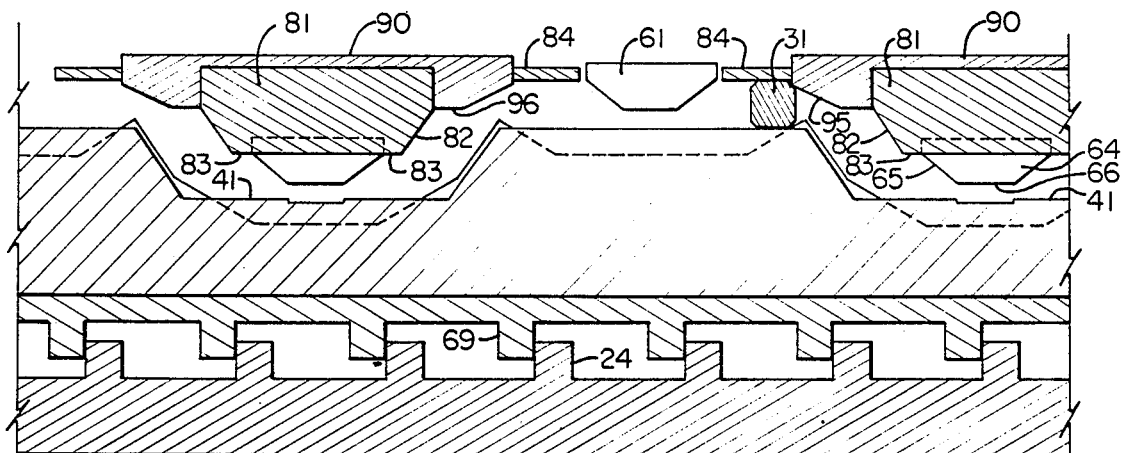

When it is desired to return to the two-wheel drive mode and, referring to FIG. 10, the same activating function is repeated that was used previously to trigger the assembly to four-wheel drive mode: Again, a command signal is directed to the electronic circuitry 300, which in turn energizes the solenoid 220 and advances solenoid legs 225 against interrupter 90; and as shown in FIG. 10 interrupter 90 is driven inboard. The leg tips 91 of interrupter 90 intercept the tabs 23 of the ground clutch 11 and with the interrupter 90 keyed to the rotating cams the sudden interruption of the rotating cams along with the continued rotation of cam follower 31 causes the cam follower 31 again to traverse the plateau 43 toward the right. Referring to FIG. 10 the interrupter 90 has been driven inboard as described above triggering the mechanical function whereby the cam follower 31 is driven against slope 52 of ground lock cam 70, driving the teeth 69 into re-engagement with teeth 24 of the ground clutch 11 and causing the cam follower 31 to drive toward slope 82 of discam 80.

As viewed in FIG. 10, continued rotation of the cam follower 31 to the right will cause the cam follower to drive against the sloped face 95 of interrupter 90 which, upon continuous rotation of cam follower 31, will drive the interrupter 90 outboard against solenoid legs 225 to de-activate solenoid 220; and at the same time the interrupter leg tips 91 are driven away from interception with ground clutch 11. As the cam follower 31 continues to be driven to the right it will interface against slope 82 of discam 80 and with continuous driving to the right the cam follower 31 will traverse slope 82 in an inboard direction until the cam follower 31 reaches the channel formed by face 83 of discam 80 and face 41 of plateau cam 40. When the cam follower 31 has reached the junction of discam faces 82 and 83 and is about to travel through the aforesaid channel the drive gear 30 has already been driven to cammed disengagement away from receiving gear 100 in preparation for driving against the sloped face 65 of ground lock cam 70.

Referring again to FIG. 6, once the cam 31 has driven ground lock cam lobe 64 outboard board to disengage ground lock cam 70 from ground clutch 11 and with the cam follower at rest in detent 46 of plateau 41 of plateau cam 40, the combined assembly of drive gear 30, plateau cam 40, ground lock cam 70, discam 80 and interrupter 90 are free from ground clutch 11 and can remain stationary in the two-wheel drive mode. In this relation, the assembly is free to rotate or spin down in dissipating the energy from the centrifugal force of the spinning differential gear until reaching a non-rotating, stationary position. When the cam follower is at the plateau 41 in detent 46 of plateau cam 40 and since there is no mechanical connection of plateau cam 40 to a non-rotating mechanical ground, the drive shaft A and connected components including the drive gear 30, plateau cam 40, ground lock cam 70, discam 80 and interrupter 90 may rotate either as a result of vehicle jounce, or a false torque from frozen lubricants or other reason without accidentally driving to engagement. Moreover, with the cam follower 31 at the plateau 43 and no mechanical connection to a non-rotating ground, such as, ground clutch 11, the drive gear 30, plateau cam 40, ground lock cam 70, discam 80, interrupter 90 and receiving gear 100 are free to rotate in unison under torque in either direction; and when changing direction will maintain their rotational locations and stay in four-wheel drive mode until signaled and positively activated by the solenoid 220 to change operating mode.

In summary, the cam follower 31 is confined within a fixed and sized channel formed by the plateaus and sloped faces of plateau cam 40 and the parallel flange faces and slopes of discam 80 as well as the faces 63 of ground lock cam 70. When the cams are fixed against or retarded to a slower rotation while the drive gear 30 and integral cam follower 31 rotate, the cam follower 31 is forced to travel through the pre-described fixed channel, causing axial movement of the drive gear and solenoid control; and the engagement and disengagement of the intercepted ground lock cam enables the cam follower 31 to move from an inboard to an outboard plateau upon a command signal then retain its next mode location until again signaled to change the drive gear location and mode of operation. The foregoing is accomplished without changing vehicle direction, shifting between forward and reverse and independently of vehicle speed, direction, wheel turning and other vehicle operation variables.

As described in connection with FIGS. 6 through 10, the ground clutch assembly 11 enables release from a fixed or zero ground to provide rotational synchronization of the drive gear 30 and receiving gear 100 as well as a fail-safe mechanism to protect the power train components from excessive abuse and damage. Referring to FIG. 4, the ground clutch 11 consists of the nut 12, rollers 15, driver 28 and wrap spring 16. The driver 28 consists of a weldment affixing ground flange 14 to cage 13. In the assembled state, the rollers 15 pocket into detents 19 of nut 12 and are held in circumferentially spaced relation within slots 25 of ground clutch driver 28, and the slots 25 cage the rollers to the same circumferential spacing as the detents 19 of nut 12. Wrap spring 16 wraps around and against the roller 15, thereby compressing the rollers radially inwardly against and into the detents 19 of nut 12. When the ground clutch driver 28 is rotationally driven, the linear faces of slots 25 drive against rollers 15. The detents 19 of nut 12 are shaped with a larger radius than the radius of the rollers 15; therefore, when the rollers 15 are rotationally driven they do not immediately eject from detents 19 but undergo a gradually increasing resistance as they expand against the wrap spring 16 when driven radially outwardly toward ejection. The combination of the exit angle of the detents 19 and the radial compressive force of wrap spring 16 determines the foot pounds of rotational power required to drive the rollers 15 out of the detents 19. Accordingly, the ground clutch 11 has a preset resistance to rotation which allows rotation of the clutch driver 28 only when the torque applied exceeds the preset resistance. Using 40 foot pounds as a preset resistance example it is possible to establish the functional relationship between the ground clutch 11 and the product function.

There are three basic operational conditions under which the ground clutch 11 enhances the product function as well as protecting the components of the total power train: One condition occurs when the vehicle is stuck and in two-wheel drive mode with the rear wheels at poor surface adhesion and likely to spin. Triggering the product to four-wheel drive mode will cause an impact penetration of drive gear 30 into receiving gear 100. The 40 foot pounds resistance at the plateau cam which is engaged to the ground clutch 11 translates to linear forces of 350 to 400 axial force pounds insuring a sufficient penetration of gear 30 into gear 100. In the event the gear. 30 cannot fully penetrate the gear 100 because of high torque and adhesive frictional sliding resistance at the interfacing of the respective gear splines, continued rotation of the drive gear 30 will release the ground clutch 11 limiting the rotational force of cam follower 31 against slope 42 of plateau cam 40 thus permitting the cams to rotate without damage to the gears, cams and drive axle shaft. This is a normal though abusive condition, where release of the ground clutch protects the power train and the product. A second normal condition occurs if the assembly is triggered from a standing start of the vehicle or with the vehicle in motion as the drive gear 30 moves axially to intercept and engage the receiving gear 100. Should the splines interface at tip-to-tip to prevent penetration of one spline into the other, the drive gear 30 will momentarily stop its linear climb up plateau cam slope 42 and with continued torque the ground clutch releases allowing continued rotation of shaft A and drive gear 30 until the drive gear spline penetrates the receiving gear spline. A third condition of the ground clutch occurs during dynamic engagement; that is, triggering the mechanism to engage when the vehicle is in motion. Conventional transfer cases supplying power to the front axle, when actuated, cannot speed up quickly to match the speed of the vehicle rear axle. Thus, the front wheels and receiving gears 100 will rotate at a higher speed than the drive shaft A. In triggering the mechanism, the drive gear 30 will intercept or interface receiving gear 100 which is rotating at a higher speed. In the split second of intercept or interfacing of the gears, the ground clutch 11 releases to allow the receivng gear to become the driver thereby accelerating and driving the drive gear 30 into synchonous engagement.

It is also readily apparent that a single axle disconnect, FIG. 2, integral with the axle housing and away from the rotating wheels and steering knuckles may be actuated by a switch and wire system directly from the transfer case rotation output switch to the axle disconnect solenoid at the front axle housing. Further, an alternate construction would cause the solenoid to drive a slideable receiving gear 100 to frictionally and partially intercept the drive gear 30 while simultaneously locking the cams to ground, causing engagement of the product when the vehicle is moving, without transfer case engagement and torque from the transfer case; that is, independent of the transfer case using the power derived from vehicle motion driving the front wheels and causing the receiving gear 100 to become the driving gear.

As diagrammatically illustrated in FIG. 12, a signal transmitting system directs an actuating signal to actuate the clutch assembly either for the purpose of shifting into or out of four-wheel drive. As represented, transfer case T includes an electral lead into a one-shot delay 232, oscillator 234 and amplifier 236 to a signaling antenna 238. When the vehicle operator shifts the transfer case T this action physically closes a power supply switch, not shown, to power and activate the timer or one-shot delay 232. This timer delays for a pre-determined interval, typically a matter of seconds, to allow time for the transfer case to impart torque to the front axle so as to assure that the drive shaft A is under rotation prior to sending a signal. After the predetermined delay, the oscillator 234 establishes a specific frequency which is then amplified by amplifier 236 and directed by signaling antenna 238 into the signal receiving circuit 300 illustrated in FIG. 13. In FIG. 13, receiving antenna 240 receives a signal from the signaling antenna 238, and an analog filter 242 filters out all other frequencies except that of the signaling antenna and allows the full signal to pass to a pulse counter switch 244. Switch 244, by counting and loading to sufficient compacitance insures that the system is receiving a signal from the transmitter rather than a false or stray signal from extraneous or shortterm noise. Once a true signal is determined, the switch 244 then starts a timer 246 which activates power switch 248 to supply power from the battery power source 205 and energize the solenoid 220 to shift the interrupter 90 into engagement with the ground clutch assembly 11. When the cam followers 31 drive the interrupter 90 in a direction retracting the interrupter from engagement with the ground clutch 11, such mechanical action mechanically drives the solenoid open and kick back switch 250 recognizes a reverse current pulse from the solenoid 220 and shuts off current to the solenoid as well as the rest of the system. It will be evident that, although a means of remote actuation and control for the shift mechanism has been described, the same could be accomplished by direct manual or mechanical actuation by manually pressing in the interruptor 90 and retaining in the intercept position until the cam followers drive the interceptor out of that position in preparation for the next shifting operation.

It will be appreciated from the foregoing that the preferred form of ground clutch assembly offers a number of advantages in providing a continuous, enclosed cam channel which confines the movement of the cam followers 31 along an established path of travel while controlling positive intermitent engagement and disengagement of the camming assembly with respect to ground both in two-wheel and in four-wheel drive modes. The cam lobes 61 and 64 at the centers of the plateau cams permit positive disengagement of the camming assembly from the ground lock. At the same time, the interrupter mechanism will trigger the cam followers to properly drive the ground lock cam but is disengaged once it has served its function of maintaining engagement until the ground lock cam has engaged ground. The elements 15 of the assembly avoid use of compressible members and result in greater life while permitting different depth pockets on the periphery of the nut member 12 spaced in between the deeper roller pockets 25. Thus the rollers from pockets do not have to be located circumferentially at equally spaced intervals. Moreover, the ground clutch can have separate wrap springs to determine the ejection curve and radial threshold while the roller is free to travel the periphery of the nut. It is not necessary to rely upon spring loading to drive against a gear and cam that would drive a cam flange against a thrust bearing. Moreover the cams and drive gear assembly 30, 40, 70, 80, 90, 36, 39 and 73 are free to float in a linear direction as an assembly but are held in position by the washer 17 and ledge 106.

It is to be understood from the foregoing description of a preferred form of present invention that various modifications and changes may be made therein without departing from the spirit and scope of the invention as defined by the appended claims.

We claim:

1. A clutch assembly for converting a vehicle between two-wheel drive and four-wheel drive by effecting dynamic engagement and disengagement between a drive shaft and a ground engaging wheel to be driven and wherein torque applying means are provided to selectively and positively rotate the drive shaft, said clutch assembly comprising;

a fixed locking member;

a receiver gear drivingly connected to said wheel to be driven;

a drive gear keyed for rotation with said drive shaft and being axially movable with respect to said drive shaft, said drive gear interposed between said fixed locking member and the wheel to be driven and cam follower means associated with said drive gear;

an axially movable camming assembly provided with a cam surface, said cam follower means along with cam surface to impart axial movement to said drive gear along said drive shaft when said camming assembly is fixed against rotation and said drive gear is being rotated by said drive shaft; and shift means movable into engagement with said fixed locking member whereby to temporarily lock said camming assembly against rotation, said cam follower means being responsive to positive rotation of said drive shaft when said camming assembly is locked against rotation by said fixed locking member to advance between first and second portions of said cam surface whereby said drive gear is advanced in an axial direction into and out of engagement with said receiving gear and said shift means and camming assembly are released from locking engagement with said fixed locking member so that said shift means and camming assembly are thereafter rotatable with said drive gear, and activating means for moving said shift means into engagement with said locking member independently of the application of torque to said drive shaft or the rotation of said wheel to be driven.

2. A clutch assembly according to claim 1, said activating means operative to cause said shift means to advance said camming assembly into locking engagement with said fixed locking member when said drive gear is drivingly connected to said receiving gear whereby continued rotation of said drive gear causes said drive gear to be separated from said receiving gear when said cam follower means traverses said first portion of said cam surface.

3. A clutch assembly according to claim 2, said drive gear operative to shift said camming assembly away from engagement with said fixed locking member after said drive gear is separated from said receiving gear and said cam follower means traverses said first portion of said cam surface.

4. A clutch assembly according to claim 1, wherein said vehicle includes a fixed housing disposed in outer spaced concentric relation to said drive shaft and terminating in axially spaced relation to said wheel member to be driven, said fixed locking member having inner and outer concentric sleeves with said inner concentric sleeve mounted in fixed relation to said spindle housing, and detent means interposed between the said inner and outer concentric sleeves operative to fix said outer concentric sleeve against rotation with respect to said inner concentric sleeve up to a predetermined force level, said outer concentric sleeve being free to rotate with respect to said inner concentric sleeve when the force of said shift means exceeds said predetermined force level.

5. A clutch assembly according to claim 4, said shift means having axially directed extension legs shiftable into engagement with locking elements on said outer concentric sleeve.

6. A clutch assembly according to claim 5, said camming assembly and said outer concentric sleeve of said fixed locking member having complementary locking elements movable into engagement with one another in response to activation of said shift means.

7. A clutch assembly according to claim 1, said camming assembly having said first cam surface portion engageable by said cam follower means to advance said drive grear axially into engagement with said receiving gear, said second cam surface portion engageable by said cam follower means to release said camming assembly from said fixed locking member for rotation with said drive gear upon engagement between said drive gear and said receiving gear, and a third cam surface portion engageable by said cam follower means to release said shift means from engagement with said locking member.

8. A clutch assembly according to claim 7, said camming assembly movable between a locking and release position with respect to said locking member irrespective of reversal in direction of rotation of said drive shaft.

9. A clutch assembly according to claim 7, said drive gear having said cam follower in the form of an outwardly projecting lug engagable with said cam surface portions.

10. A ground clutch assembly for converting a vehicle between two-wheel drive and four-wheel drive by effecting dynamic engagment and disengagement between a drive shaft and a ground-engaging wheel to be driven and wherein torque applying means are provided to selectively and positively rotates the drive shaft, said clutch assembly comprising:

a fixed locking member in outer concentric relation to said drive shaft and in axially spaced relation to said wheel to be driven;

a receiver gear drivingly connected to said wheel to be driven, said receiver gear disposed in outer concentric relation to said drive shaft between said fixed locking member and said wheel to be driven;

a drive gear keyed for rotation with said drive shaft and being axially movable with respect to said drive shaft, said drive gear being interposed between said fixed locking member and the wheel to be driven, and said drive gear provided with cam follower means thereon;

an axially movable camming assembly disposed in outer concentric relation to said drive gear and provided with a cam surface engagable by said cam follower means to impart axial movement to said drive gear along said dirve shaft when said camming assembly is fixed against rotation and said drive gear is rotated by said drive shaft; and shift means associated with said camming assembly and movable into engagement with said fixed locking member independently of the rotation of said drive gear or receiving gear, said cam follower means responsive to positive rotation of said drive shaft in either direction when said shift means is locked against rotation to successively (i) advance said camming assembly into direct engagement with said fixed locking member, (ii) advance said drive gear into engagement with said receiving gear and (iii) release said shift means and said camming assembly from locking engagement with said fixed locking member whereby said dirve gear and receiving gear are rotatable independently of said fixed locking member.

11. A ground clutch assembly according to claim 10, including activating means for selectively advancing said shift means and said camming assembly into locking engagement with said fixed locking member when said drive gear is drivingly connected to said receiving gear whereby continued rotation of said drive gear with said drive shaft causes said drive gear to be separated from said receiving gear in traversing said one portion of said cam surface.

12. A ground clutch assembly according to claim 10, said camming assembly defined by a plurality of concentric sleeves including a first sleeve having a first cam surface thereon facing in a direction away from said fixed locking member, a second sleeve having a second cam surface portion thereon facing in a direction toward said fixed locking member, and a third sleeve having a third cam surface portion thereon facing in a direction toward said fixed locking member.

13. A ground clutch assembly according to claim 12, said first, second and third cam surface portions defining a channel therebetween for movement of said cam follower in a generally circumferential direction.

14. A ground clutch assembly according to claim 12, said one cam surface portion operative to advance said drive gear axially into engagement with said receiving gear, said other cam surface portion engageable by said drive gear to release said camming assembly from said fixed locking member for rotation with said drive gear upon engagement between said drive gear and said receiving gear, and a third cam surface portion engageable by said drive gear to return said shift means to a neutral position.

15. A ground clutch assembly according to claim 14, said camming assembly movable between a locking and release position irrespective of reversal in direction of rotation of said drive shaft.

16. A ground clutch assembly according to claim 14, said followers defined by a pair of diametrically opposed, outwardly projecting lugs engagable with said cam surface portions.

17. A ground clutch assembly according to claim 10, wherein said vehicle includes a housing in outer spaced concentric relation to said drive shaft and terminating in axially spaced relation to said wheel member to be driven, said fixed locking member having inner and outer concentric sleeves with said inner concentric sleeve mounted in fixed relation to said spindle housing, and detent means interposed between the said inner and outer concentric sleeves operative to fix said outer concentric sleeve against rotation with respect to said inner concentric sleeve up to a predetermined force level, said outer concentric sleeve rotatable with respect to said inner concentric sleeve when the torque applied by said shift means exceeds said predetermined force level.

18. A ground clutch assembly according to claim 17, said shift means having axially directed extension legs shiftable into engagement with locking elements on said outer concentric sleeve.

19. A ground clutch assembly according to claim 18, said camming assembly and said outer concentric sleeve of said fixed locking member having complementary locking elements movable into engagement with one another in response to activation of said shifting means and relative rotation between said drive gear and said camming assembly.

20. In a clutch assembly for converting a vehicle between two-wheel drive and four-wheel drive by effecting positive engagement and disengagement between a drive shaft and a ground-engaging wheel to be driven, there being a receiver gear drivingly connected to the gound-engaging wheel and a drive gear keyed for rotation with said drive shaft but axially movable with respect to said drive shaft and provided with a cam follower thereon, the combination therewith comprising:

an axially movable camming assembly in outer concentric relation to said drive gear having a circumferentially continuous camming channel defining a confined passageway in which said cam follower is constrained to move;

a fixed locking member in outer concentric relation to said drive shaft and in axially spaced relation to said gound-engaging wheel, said camming assembly having axially directed locking elements movable into engagement with said fixed locking member; and shiftable interrupt means movable into engagement with said fixed locking locking member to initiate movement of said camming assembly into engagement with said locking member independently of engagement and disengagement between said drive gear and said receiver gear.

21. In a clutch assembly according to claim 20, including activating means for selectively activating said shiftable interrupt means in response to an electrical signal, said shiftable interrupt means movable out of engagement with said locking member upon movement of said camming assembly into engagement with said locking member.

22. In a clutch assembly according to claim 21, said activating means including a solenoid, an electrical power source and control circuit means to activate said solenoids in response to an electrical signal applied thereto.

23. In a clutch assembly according to claim 22 said control circuit means including a receiving antenna and a signal transmitting circuit including a signalling antenna for directing a remote control signal to said receiving antenna for energizing said activating means.

24. In a clutch assembly according to claim 23, said cam follower operative to retract said shiftable interrupt means from engagement said fixed locking member independently of said camming assembly.

25. In a clutch assembly according to claim 21, wherein said camming assembly is normally rotatable with respect to said fixed locking member, said camming assembly including a cam release portion said shiftable interrupt means being movable into engagement with said fixed locking member to prevent rotation of said camming assembly with respect to said locking member until the independent movement of said cam follower along said camming channel forces said locking elements on said camming assembly into locking engagement with said fixed locking member, the continued advancement of said cam follower along said camming channel and said fixed locking member until said drive gear is advanced axially into engagement with said receiving gear, further continued rotation of said cam follower along said camming channel after engagement between said drive gear and recieving gear causing said cam follower to move into engagement with said cam release portion causing said camming assembly to be disengaged from said fixed locking member.

* * * * *